United States Patent [19]

Williams et al.

[11] Patent Number: 5,684,692

[45] Date of Patent: Nov. 4, 1997

[54] MULTIPANELED DIGITIZER

[75] Inventors: Kevin M. Williams, Cromwell; Claude LeBlond, Broad Brook, both of Conn.; Phillip L. Henderson, Doylestown, Pa.; David J. Porter, Glenside, Pa.; Joseph Rovito, Lansdale, Pa.

[73] Assignee: Gerber Garment Technology, Inc., Tolland, Conn.

[21] Appl. No.: 525,920

[22] Filed: Sep. 8, 1995

[51] Int. Cl.$^6$ .................... G06F 19/00; G08C 21/00
[52] U.S. Cl. ............... 364/167.01; 178/18; 364/470.03; 364/560
[58] Field of Search .................. 364/167.01, 560, 364/561, 562, 559, 470.02, 470.03, 470.05, 470.06, 468.21; 178/18, 19, 20

[56] References Cited

U.S. PATENT DOCUMENTS

| | | | |
|---|---|---|---|
| 3,391,392 | 7/1968 | Doyle | 340/172.5 |
| 3,473,157 | 10/1969 | Little et al. | 340/172.5 |
| 3,534,396 | 10/1970 | Hart et al. | 235/61.6 |
| 3,596,068 | 7/1971 | Doyle | 235/150 |
| 3,693,154 | 9/1972 | Kubo et al. | |
| 3,766,528 | 10/1973 | Ichida | 340/172.5 |
| 3,811,113 | 5/1974 | Saito et al. | 340/172.5 |
| 3,887,903 | 6/1975 | Martell | 340/172.5 |
| 3,895,355 | 7/1975 | Shorrock | 340/172.5 |
| 3,924,244 | 12/1975 | Seitz | 340/172.5 |
| 4,058,849 | 11/1977 | Fitzgerald et al. | 364/520 |
| 4,149,246 | 4/1979 | Goldman | 364/200 |
| 4,429,364 | 1/1984 | Maruyama et al. | 364/400 |
| 4,451,895 | 5/1984 | Sliwkowski | 364/521 |
| 4,539,585 | 9/1985 | Spackova et al. | 358/93 |
| 4,546,434 | 10/1985 | Gioello | 364/300 |
| 4,552,991 | 11/1985 | Hulls | 178/19 |
| 4,570,033 | 2/1986 | Hulls | 178/19 |
| 4,598,376 | 7/1986 | Burton et al. | 364/470 |
| 4,621,959 | 11/1986 | Kishi et al. | 409/84 |
| 4,658,373 | 4/1987 | Murakami et al. | 364/559 |
| 4,697,050 | 9/1987 | Farel et al. | 178/18 |
| 4,704,694 | 11/1987 | Czemiejewski | 364/513 |
| 4,725,961 | 2/1988 | Pearl | 364/475 |
| 4,739,487 | 4/1988 | Bonnet et al. | 364/475 |
| 4,744,035 | 5/1988 | Hashim | 364/470 |
| 4,807,143 | 2/1989 | Matsurva | |
| 4,853,715 | 8/1989 | Paschkis | 346/139 |
| 4,901,359 | 2/1990 | Bruder | 382/8 |

(List continued on next page.)

FOREIGN PATENT DOCUMENTS

| | | |
|---|---|---|
| 0 182 144 A | 5/1986 | European Pat. Off. . |
| 0 338 964 A2 | 10/1989 | European Pat. Off. . |
| 0 332 765 A3 | 9/1990 | European Pat. Off. . |
| 2 548 077 | 12/1983 | France . |
| 2 586 959 | 9/1985 | France . |
| 1221349 | 4/1988 | France . |
| 3 519 806 | 8/1986 | Germany . |
| 4100534 C1 | 1/1992 | Germany . |
| 85634A/89 | 8/1989 | Italy . |
| 2050658 | 1/1981 | United Kingdom . |
| WO/86/0667 | 11/1986 | WIPO . |

OTHER PUBLICATIONS

Lisa Cedrone, "CAD/CAM Marches On", pp. 82–86, Bobbin, Jan. 1991.

*Manufacturing Clothier*, pp. 12,13, Oct. 1991.

Primary Examiner—Joseph Ruggiero
Attorney, Agent, or Firm—McCormick, Paulding & Huber

[57] ABSTRACT

A two-dimensional digitizing system comprises a plurality of overlaid digitizer tablets. Each tablet includes two wire grid circuits oriented at right angles to each other for the X and Y directions, with each circuit having conductive grid structures. In those circumstances where two panels generate position signals, a controller verifies which of the competing position signals is correct. The digitizer is also characterized by a capability to operate at large stylus-tablet separations, allowing for a multi-layered laminate tablet of substantial thickness. The present system is readily adapted for applications such as a cloth cutting in which large surface areas are required and in which the digitizer tablet circuitry must be located remote from a cutting surface.

23 Claims, 6 Drawing Sheets

U.S. PATENT DOCUMENTS

| | | | |
|---|---|---|---|
| 4,941,183 | 7/1990 | Bruder et al. | 382/8 |
| 4,961,149 | 10/1990 | Schneider et al. | |
| 4,963,703 | 10/1990 | Phillips et al. | 178/19 |
| 4,982,437 | 1/1991 | Loriot | 382/8 |
| 5,027,416 | 6/1991 | Loriot | 382/8 |
| 5,068,799 | 11/1991 | Jarrett, Jr. | 364/507 |
| 5,089,971 | 2/1992 | Gerber | 364/470 |
| 5,172,326 | 12/1992 | Campbell, Jr. et al. | |
| 5,175,806 | 12/1992 | Muskovitz et al. | |
| 5,258,917 | 11/1993 | Bruder et al. | 364/474.13 |
| 5,317,502 | 5/1994 | Reiffel et al. | 364/167.01 |
| 5,341,305 | 8/1994 | Clarino et al. | 364/470 |
| 5,450,348 | 9/1995 | Roemersma | 364/188 X |

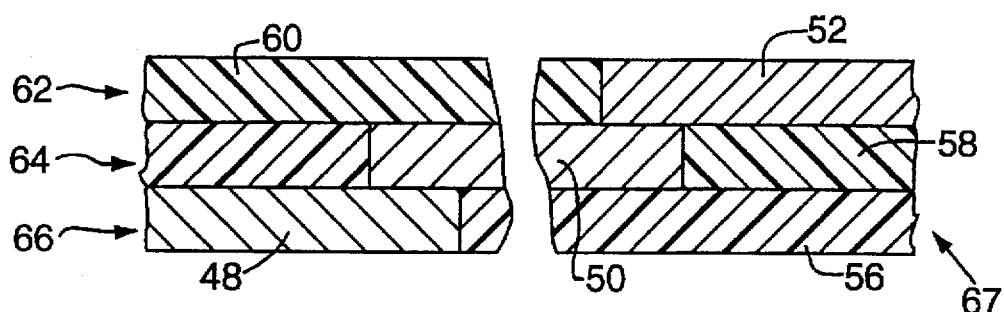
FIG. 6
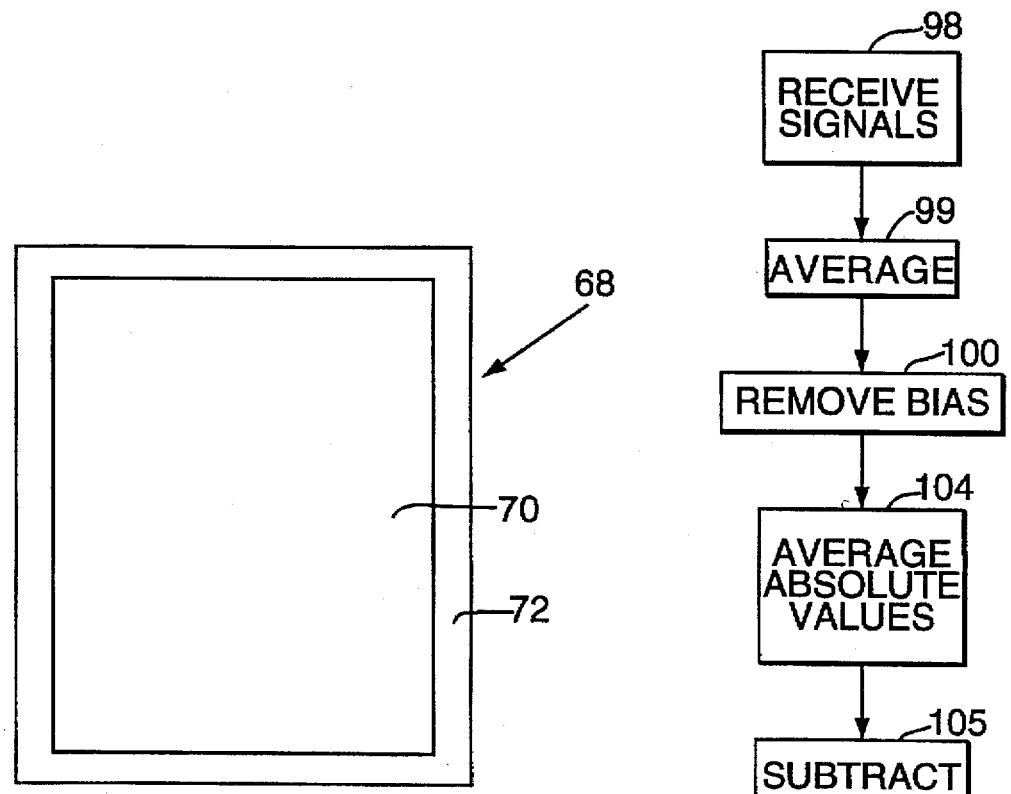
FIG. 7
FIG. 13

MULTIPANELED DIGITIZER

TECHNICAL FIELD

The present invention relates generally to the field of two dimensional digitizers, and more particularly to two dimensional digitizers having a plurality of wire grid panels, and digitizers which are capable of operation at large tablet to stylus distances.

CROSS REFERENCE TO RELATED APPLICATIONS

Some of the subject matter hereof is disclosed and claimed in the commonly owned U.S. Pat. No. 5,341,305; U.S. patent application entitled "A Pattern Alignment and Cutting System", U.S. patent Ser. No. 08/525,919, filed on Sep. 8, 1995; U.S. patent application entitled "Sample Garment Making System", U.S. patent Ser. No. 08/525,123, filed on Sep. 8, 1995 and U.S. patent application entitled "Method and Apparatus for Cutting Sheet Material", U.S. patent Ser. No. 08/525,412, filed on Sep. 8, 1995 which are incorporated herein by reference.

BACKGROUND OF THE INVENTION

Two dimensional digitizers generally consist of a movable "cursor" in a digitizing puck or a stylus coil and a system of wire conductors wound to form a "grid" in a plane so that the voltage induced in the grid wires by the stylus coil is a function of the position of the coil relative to the grid wires. Alternatively, a voltage may be induced in the stylus coil by signals in the grid wires. In most systems the grid wires are connected to form a single continuous convoluted winding with the induced voltage being produced between the two ends of the winding. The grid wires are usually mounted just beneath or contained within a flat surface which is referred to as a digitizing tablet. The graphical material to be digitized is placed upon the surface of the tablet and the cursor coil is positioned as required to digitize the information.

The process of digitizing the stylus position involves producing two electrical signals (X and Y), which possess a measurable property (amplitude, phase, frequency or pulse width), which is in known relationship to the XY coordinates of the cursor position with reference to some predefined cartesian coordinate system. In most implementations the X and Y coordinates are obtained using two identical orthogonal systems. The system is ideally only sensitive to changes in position along a single axis arranged to be the X axis for one system and Y axis for the other.

It is almost impossible to produce two completely independent systems because of edge effects which appear as the stylus coil approaches the edge of the tablet. These errors can be minimized by restricting the cursor from operating near the tablet edge and/or providing error compensation (software or hardware). An extensive discussion of an automatic coordinate determining devices similar to the present type is disclosed in U.S. Pat. Nos. 3,647,963, 3,735,044 and 3,801,733. An example of a polyphase digitizer that has a simplified grid winding and self compensation is disclosed in U.S. Pat. No. 4,570,033. U.S. Pat. No. 4,552,991 discloses a single phase digitizer that yields a single output signal linearly related proportional to the phase difference. An absolute position coordinate digitizer is contained in U.S. Pat. No. 3,735,044. All of the above patents are incorporated herein by reference.

The digitizers of the prior art are adapted for use with a cursor or stylus that is placed in close proximity to the digitizing grid where only the thickness of paper or cardboard and the top tablet layer establish the stylus-grid separation. The magnetic flux generated by this interaction is generally confined to the immediate vacinity of the digitizer tablet surface. For slightly increased separations, problems associated with signal strength and stylus tilt can normally be resolved by adjustment of the excitation signal gain. However, there are applications which require the digitizer grid to be located at a substantial distance from the closest approach of the stylus. See for example the garment cutting technique disclosed in claimed U.S. Patent application Ser. No. 08/525,919 filed on Sep. 8, 1995, entitled a "A Pattern Alignment And Cutting System" and assigned to the Assignee of the present invention. That application requires that the digitizer tablet be spaced at a large relative distance to the cloth to allow for penetration of a cutting knife into a bristle bed which is placed between the digitizing tablet and the upper table surface. Digitizers of the prior art are not adapted to operate under these conditions, since the stylus is located at a distance in excess of what essentially corresponds to a "pen off" condition.

Similarly, an application such as the fabric cutter referred to above require a digitizer to have very large areas to accommodate fabric or hides. Prior art digitizers have large digitizing tablets limited to approximately 62 inches across the tablet because of accuracy and resolution limitations in the absolute measurement system. Expansion of known digitizers to accommodate tablets of large areas presents electrical circuit limitations and would require substantial customization for each tablet size.

It is therefore advantageous to have a digitizer in which this tablet is comprised of multiple wire grid sections or panels each having dimensions corresponding to a standard tablet. This would obviate the need for customizing each digitizer in dependence on the desired area of the tablet and allow for standardization of important components of the digitizer circuitry. Moreover, it would also be advantageous to have a digitizer system in which the tablet can be vertically spaced from the work surface such that a substantial gap exists between the closest approach of the cursor to the tablet without a corresponding loss of accuracy or other functionality. The present invention is drawn towards such a digitizer system.

BRIEF DESCRIPTION OF THE DRAWINGS

FIG. 6 is a simplified illustration in section of overlayed digitizer panels of the type shown in FIG. 5.

FIG. 7 is a schematic illustration showing the inaccurate border region in a digitizer tablet panel.

FIG. 13 is a simplified diagrammatic illustration showing a portion of the position verification algorithm of FIG. 9.

SUMMARY OF THE INVENTION

Figure 1A:
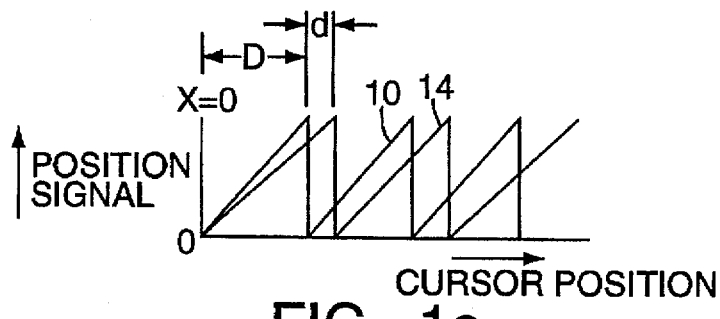
FIGS. 1(a), 1(b) and 1(c), are graphical illustrations showing two grid position signals as combined to produce an absolute cursor position signal.

An object of the present invention is to provide a digitizer system which is characterized by overlayed multiple panels and expandable to tablets of arbitrary dimensions.

Another object of the present invention is to provide a digitizer system of the foregoing type in which the multiple position signals and created by the overlayed panels are configured to provide a single output signal.

Still another object of the present invention is to provide a digitizer system which is capable of operation with large stylus and tablet distances.

Another object of the invention is to provide a digitizer system of the foregoing type in which stylus coil tilt angle effects are reduced.

Still another object of the present invention is to provide a digitizer system of the foregoing type in which is capable of operation in a multi-layered, laminate structure.

Yet another object of the present invention is to provide a digitizer system of the foregoing type in which the panel electronics can be readily integrated into a multiple panel configuration.

According to one aspect of the present invention, a digitizer system for use in generating an array of electrical signals indicative of a two-dimensional position of points on a surface includes a lower layer, a digitizer tablet having upper and lower digitizer panels. Each of the digitizer panels has a first conductor grid oriented parallel to the lower layer and first and second planar conductor windings oriented in a first direction. The first grid first winding includes a plurality of conductor loops having a pitch, with the first grid second winding including a plurality of conductor loops with a pitch slightly different from the pitch of the first grid first winding loops. There is a second conductor grid oriented parallel to the lower layer, with the second conductor grid having first and second planar conductor windings oriented in a second direction orthogonal with respect to the first direction. The second grid first winding includes a plurality of conductor loops having a pitch, with the second grid second winding including a plurality of conductor loops having a pitch slightly different from the pitch of the second grid first winding loops. The first panel has a portion thereof overlaying the second panel such that a section of the first and second conductor grids of each panel overlap. Also included are first and second filler portions disposed with the first and second panels to form a panel assembly of substantially even thickness on the lower layer. There is a substantially planar core received on an upper surface of the panel assembly with a work support surface defining a tablet plane. A stylus having a tip with coil that is capable of manipulation relative to said panel assembly is provided, with the stylus further having a means for generating stylus excitation signals in communicating with the panel assembly as the stylus is moved over the work support surface in proximity thereto. There is a controller that electrically communicates with the stylus and the conductor grids and which includes a position signal generator that receives signals from each of the panel conductor grids and generates, for each panel, signals indicative of the stylus coil position in the tablet plane. The system also has a position verification apparatus for evaluating the stylus coil position signals from each panel and for selecting as an output position signal the one of the first and second panel coil position signals computed to be correct.

According to another aspect of the present invention, a digitizer system for use in generating an array of electrical signals indicative of a two-dimensional position of points on a surface includes a lower layer, a digitizer tablet having a first conductor grid oriented parallel to the lower layer and having first and second planar conductor windings oriented in a first direction. The first grid first winding includes a plurality of conductor loops having a pitch, with the first grid second winding including a plurality of conductor loops having a pitch slightly different from the pitch of the first grid first winding loops. A second conductor grid is also provided that is oriented parallel to the lower layer. The second conductor grid has first and second planar conductor windings oriented in a second direction orthogonal with respect to the first direction. There is a second grid first winding that has a plurality of conductor loops having a pitch, with the second grid second winding including a plurality of conductor loops having a pitch slightly different from the pitch of the second grid first winding loops. The system also includes a substantially planar core received on an upper surface of the tablet with a work support surface defining a tablet plane. The core has a thickness in excess of 0.5 inch. There is a stylus having a tip with a coil capable of manipulation relative to the tablet. The stylus further has an apparatus for generating stylus excitation signals in communicating with said tablet as said stylus is moved over said work support surface in proximity thereto. There is also a controller electrically communicating with the stylus and the conductor grids which includes a position signal generator that receives signals from each of the conductor grids and which generates signals indicative of stylus coil position in the tablet plane.

DESCRIPTION OF THE PREFERRED EMBODIMENT

Known digitizers use the electromagnetic coupling between "grid" wire conductors imbedded in a tablet and a cursor coil as a means for developing the electric signals used in determining the X and Y coordinates of the cursor or stylus position. Each "grid" is comprised of a series of convoluted winding or loops of a conductor ranging the full extent of a tablet dimension, with the complimentary grid positioned orthoganally thereto. The loops are preferably rectangular in shape, with the loop period distance defined as the "grid pitch". The wires are electrically configured in two sets, one for the X and Y directions. To measure phase, it is preferable that each grid to be configured with a second conductor winding of somewhat different pitch.

In most embodiments, the electrical signals induced in the grid windings are phase shifted and combined to produce a signal whose phase shift relative to the cursor coil excitation current is a linear function of stylus position. Typically, the phase shift increases linearly from 0 to 360 degrees as the stylus coil moves through a distance equal to the pitch distance of the grid winding. When cursor movement continues in the same direction the phase changes abruptly to zero and increases linearly with position to 360 degrees as the stylus moves through successive intervals of length equal to the pitch distance. The position signal is therefore cyclical and can be used to accurately determine the position of the stylus coil within any given cycle. In order to provide absolute position information, the location of the particular cycle must be known as well as the position of the stylus coil within the cycle.

A convenient method of providing an absolute position signal for identifying individual cycles is to construct two position systems similar in every respect except for their pitch distances which differ fractionally by a small distance, d. Subtracting the position measurement derived from one system from the measurement derived from the other produces a signal which cycles over longer intervals of movement than either of the two signals from which it is derived. This configuration operates effectively as a vernier for that axis and allows for position measurement with a range greater than the pitch distance.

Figure 1B:
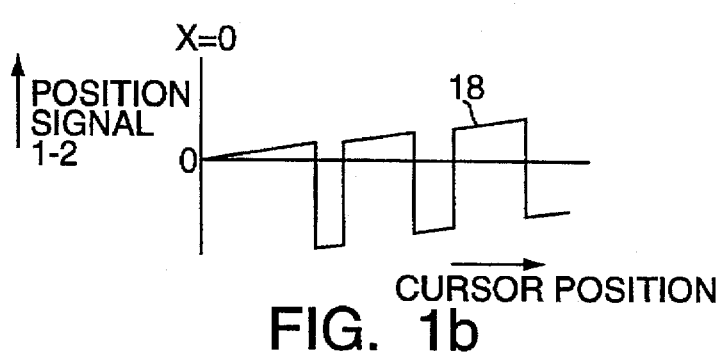
Figure 1C:
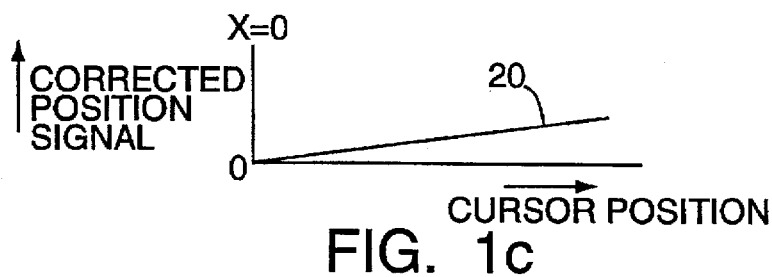
Figure 2:
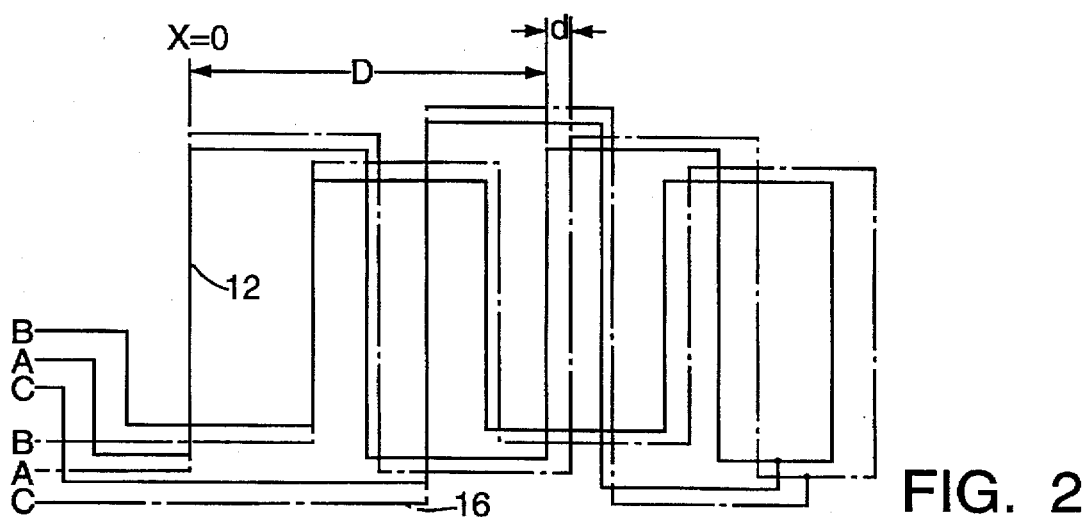
FIG. 2 is a simplified schematic illustration of a grid wire structure used in producing phase related position signals.

Referring initially to FIGS. 1a–1c, there is shown a diagrammatic illustration of two cyclical position signals generated by measuring relative phase shift and produced by a digitizer system provided by the present invention. Each cyclical position system consists of three grid wires, A, B & C, spaced 120 degrees apart mechanically. The cyclical position signal is generated by performing the vector addition of the signals in these three grid wires. Grid signal 10 is obtained from a grid winding 12, FIG. 2, with a pitch distance of D, while grid signal 14 is obtained from a grid winding 16, FIG. 2, with a winding pitch distance of D+d. Signal 18 corresponds to the difference therebetween and is discontinuous, going through an abrupt change every time either grid signal completes a cycle.

In order to obtain a simple continuous linear relationship between cursor or stylus coil position and phase shift, it is necessary to add the maximum amplitude of grid signal 10 to signal 18 whenever grid signal 10 is less than grid signal 14, yielding position signal 20. Signal 20 is the result of performing this addition on signal 18. Signal 20 can be used to provide an indication of stylus absolute position. More commonly, it is combined with the information available from either signal 10 or 14 to form a coarse/fine digitizer. Other alternative digitizer circuitry may be substituted with the present invention with appropriate modifications to hardware and software.

Figure 3:
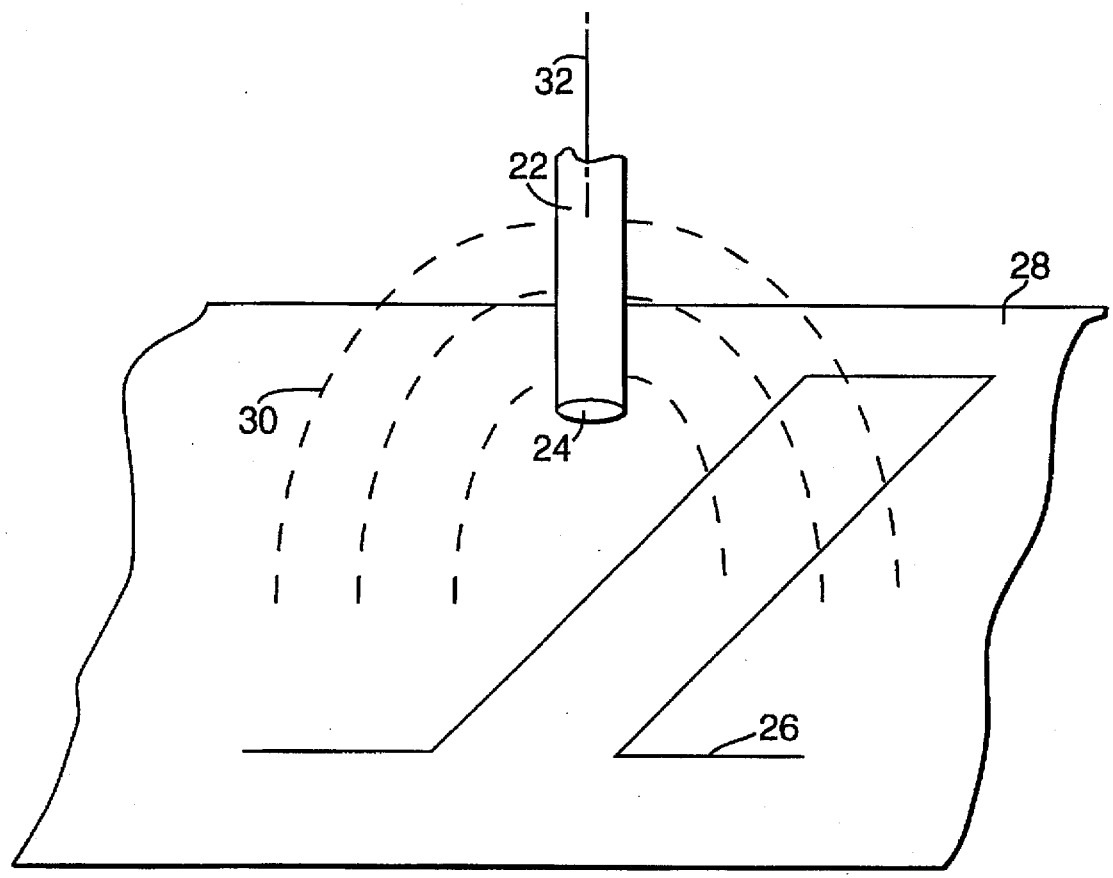
FIG. 3 is a simplified schematic illustration showing a portion of a magnetic field associated with an energized stylus or cursor over a portion of the wire grid of FIG. 2.

FIG. 3 is a simplified schematic drawing showing the general operation of a digitizer system provided in accordance with the present invention. Stylus 22 has a tip 24 containing a wire coil. In certain applications the stylus can be replaced by a digitizing puck with a cursor. The digitizer itself is comprised of a series of grid wires as discussed above, and is schematically represented as wire 26. The grid wire are arranged in a plane 28. Those skilled in the art will note that there is a complementary wire grid, not shown, oriented to yield position signals for the orthogonal direction.

When a current is passed through the stylus coil, magnetic field 30 created by the signal is extends from the cursor tip through the grid wires. A signal is generated in the grid wires and is processed by a system controller. The separation between the stylus tip and the wire, as well as the orientation of the stylus coil about a vertical axis 32 will determine, in part, the performance of the digitizer system.

Figure 5:
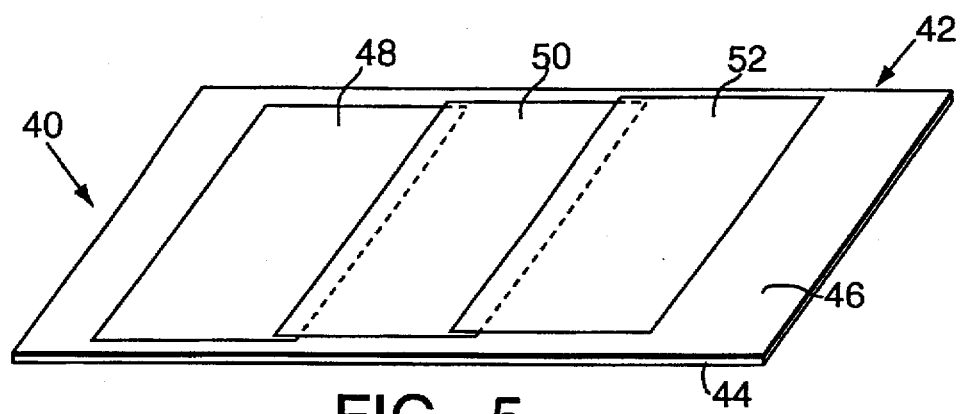
FIG. 5 is a simplified schematic illustration of a lower portion of a digitizing tablet used with a digitizer system provided in accordance with the present invention.
Figure 4:
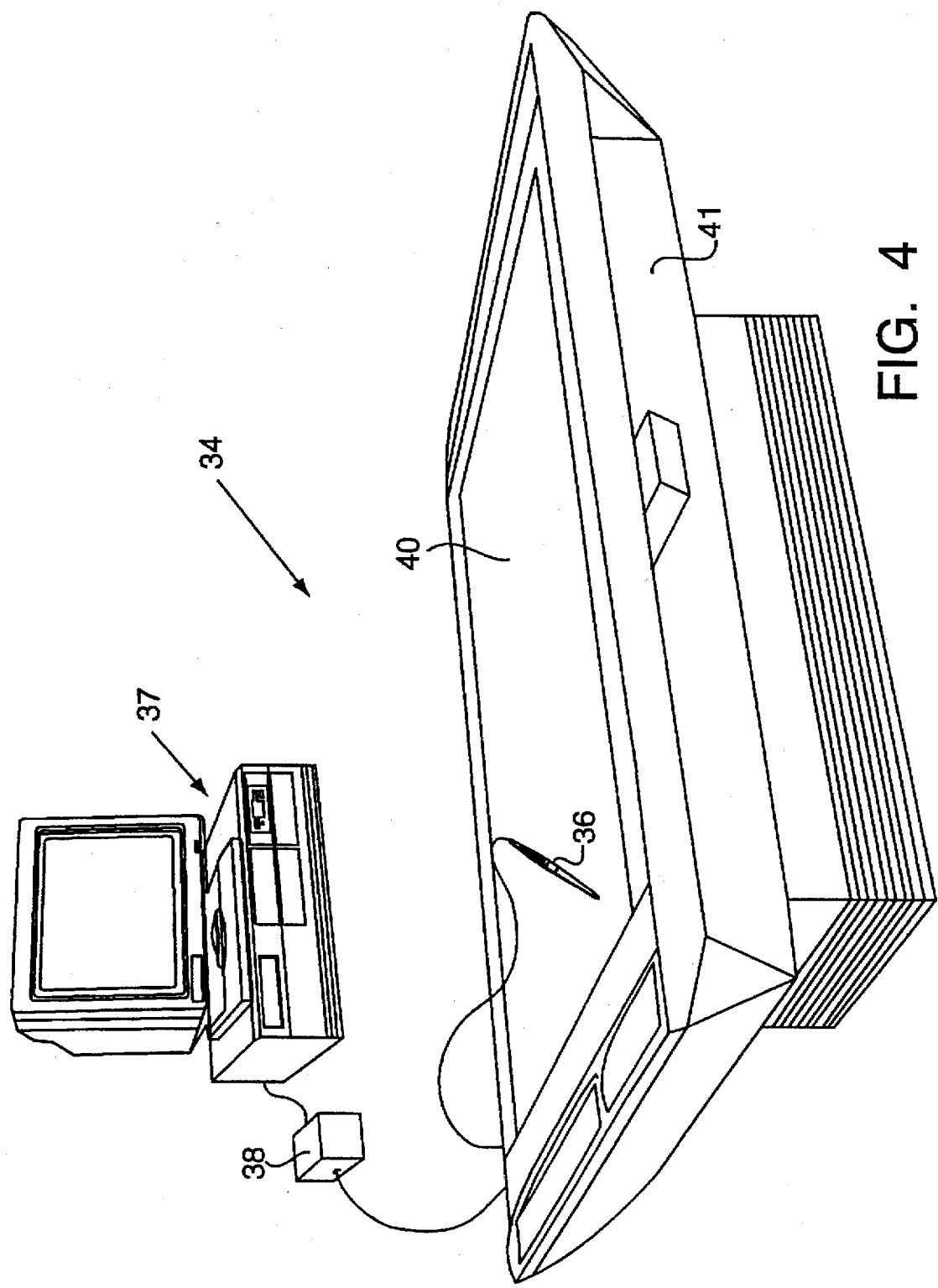
FIG. 4 is a simplified schematic illustration of a digitizer system provided in accordance with the present invention.

The present digitizer system 34 is shown schematically in FIG. 4 and includes a cursor 36, a controller 38 with excitation and signal processing circuitry communicating with a front end processor 37, preferably a personal computer, and a large area digitizing tablet 40 located on a table 41. Turning now to FIG. 5, there is shown in simplified schematic form an illustration of a lower portion 42 of the digitizing tablet 40. The portion of the digitizing tablet that is shown, includes a lower support element 44 on which is received a sheet 46 of ferromagnetic material such as steel. The steel sheet provides a return for magnetic flux emanating from the coil.

Upon the steel sheet is a plurality of digitizer wire grids for X and Y axes in the form of panels 48–52. The panels are spaced in an overlapping relationship with one another, with panel 48 disposed partially beneath panel 50 which is itself partially below panel 52. As shown schematically in section in FIG. 6, there are a series of electromagnetically passive strips 56, 58, 60 which are used with each panel to form smooth, continuous planar layers 62, 64, 66 as part of a panel assembly 67. The strip material which is used to accomplish the same is typically a plastic or its equivalent, non-ferromagnetic substance. As detailed hereinafter, the individual grids are overlayed a preselected amount determined by the requirements of an algorithm executed by controller software, detailed hereinafter. In the preferred embodiment, each panel has a length of about 71 inches and a width of about 48 inches with an overlap of approximately 8 inches. Lesser amounts of overlap can be used, with a minimum overlap of approximately 3 inches.

In certain applications, a top cap layer (not shown in FIGS. 5, 6) can be provided directly over the lower digitizer portion to simply enclose the digitizer grid, with a upper surface of the cap layer used to receive the working material. The thickness of the top layer can be minimized in certain applications. However, with certain other applications and specifically, the preferred embodiment, the top layer is itself comprised of a series of layers forming a composite assembly of substantial thickness.

Regardless of the technique used for generation of the absolute position signal, each digitizer panel 68 is characterized by inner and outer regions 70, 72, as shown schematically with panel in FIG. 7. The inner, central region of the panel is what is relied upon in generating the position signals. The signal integrity from the panel's outer region is effected by its proximity to the edge of the panel. Consequently, the signals which are generated in that region are suspect and are not used by the system in generating absolute position signals.

Figure 8:
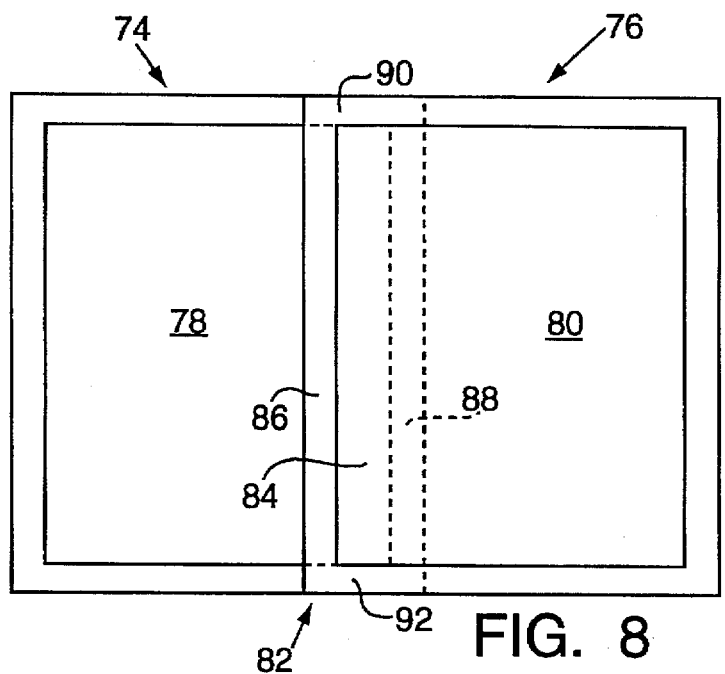
FIG. 8 is a schematic illustration showing the several regions of different position accuracy created by an overlay of digitizer panels.

Given the fact that an outer region of the panel cannot be used in generating position signals, special problems are presented when multiple panels are assembled into a large area tablet. As viewed schematically in FIG. 8, two panels. 74, 76 are overlayed with respect to one another. Those skilled in the art will note that given the inaccurate regions which border the panels, it is not possible to simply abut the adjacent panels. To do so would create a dead-zone the extent of file border regions where no accurate readings can be obtained.

The overlaying of the two panels creates several distinct regions which are characterized by differences in the characteristics of position signals generated when a stylus is brought within range. As in a single panel tablet, central regions 78, 80 provide an accurate position signal. However, an overlap region 82 is created comprised of a central overlap region 84, regions 86 and 88 in which a central region overlaps a border region and outer overlap regions 90, 92 in which the panel border regions overlap. Moreover, the central regions immediately adjacent the overlap regions are subject to edge effects from the panel border. Each panel generates position signals induced by the presence of the stylus. However, the position signals vary in strength and phase polarity in dependence on the panel region from which they emanate.

The several regions are distinctive in their responses to the electrical signals passed through the digitizer. The central overlap region is an area where effects and/or artifacts caused by the perimeter edges of each panel are not found. Consequently, signals from both panels are accurate. The overlapped central-edge regions which lie adjacent to the central overlap region are characterized by an accurate signal from one panel (central region), while the other signal (edge region) is rendered inaccurate by edge effects. Similarly, the outer overlap regions yield position signals from one panel which is equally unreliable and cannot be used. That portion of central panel regions which lies adjacent the central overlap region can also yield erroneous signals.

Those skilled in the art will note that the magnetic field generated by the interaction of the wire grid and stylus tip does not produce position signals whose strength (i.e., amplitude) varies inversely with the square of the distance from the stylus. Edge effects can cause the signal strength to increase, although the edge is further away from the stylus tip then a more interior grid winding. The present system determines, in part, from which region the signals emanate and further computes which can be relied upon to provide useful information about file position of the stylus tip.

Figure 9:
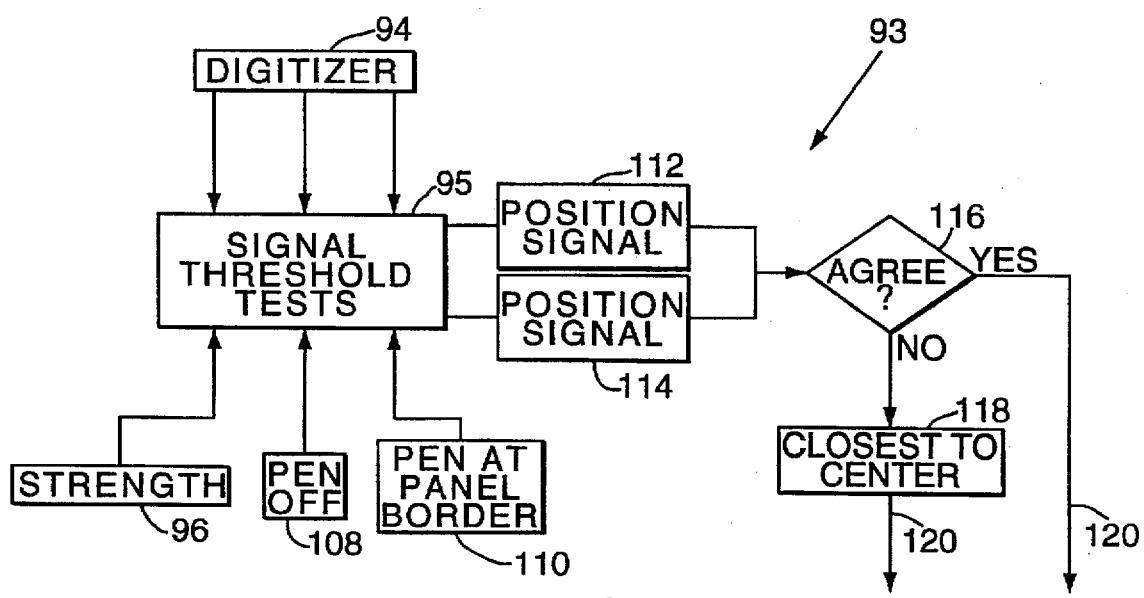
FIG. 9 is a simplified diagrammatic illustration showing the operation of a position verification algorithm used by the present digitizer.
Figure 10:
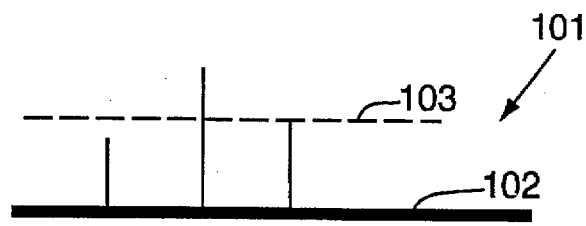
FIG. 10 is a simplified diagrammatic illustration showing the effects of an averaging process used by the position verification algorithm of FIG. 8.

Referring now to FIGS. 9, 10 and 13, there is shown a simplified illustration of a process 93 executed by the present controller to generate an accurate position signal from the several panels. The present digitizing system solves the problem of multiple signals from overlayed panels by employing a "verification" process that uses data from the signal strength of each of the three (or two) panel position signals, the pattern of signal imbalance and/or polarity change between the three phase signals of a grid as part of a modified position determination algorithm used with a single panel digitizer tablet.

The digitizer system samples signals from the panels (block 94). Each panel signal is compared (block 95) against a number of threshold tests, primarily signal strength (block 96.) In the three panel tablet, almost all stylus positions will yield signals of sufficient strength from, at most, two panels. The three phase signals of a panel's grids display signal characteristics are advantageously used by the present system as part of the signal strength test. When the stylus is in the central operating area of a grid, the amplitudes of the signals for the three phases generally sum to zero. However, when the stylus is at or near the edge of the grid, the signals behave very differently; usually all signals are positive or negative in sign.

An algorithm 97 executed by the present system during the present verification process is shown diagrammatically with respect to FIG. 13. After receipt of the signals from a panel grid (block 98), the three phase signals from that grid are averaged (block 99) and, thereafter, the average is subtracted from each individual signal (block 100). Those skilled in the art will note that only one of the four conductor windings of a panel needs to be used in this verification process as the results are assumed to be similar for the other windings.

This averaging process performed by the present invention is illustrated by diagram 101 in FIG. 10. This step removes any signal bias caused by location. Grid edge effects can result in winding signals with a signal offset whose magnitude increases with proximity to the grid edge. The subtraction of the signal average from each signal effectively moves the baseline 102 of the three signals up to the average level (line 103); thereby removing the offset. Failure to remove this offset would greatly reduce the usefulness of the magnitude threshold test.

Referring again to FIG. 13, these adjusted bias panel signals which are now without bias are averaged without regard to sign (block 104, FIG. 13). Thereafter, this adjusted bias panel signal average is also subtracted from each individual adjusted bias panel signal (block 105) and compared against a threshold (block 106). Signals which do not exceed the threshold are merely noise whose magnitude has been enhanced by edge effects.

Other threshold tests include one for signal behavior which is indicative of the stylus being off the table entirely (block 108), and for the stylus being adjacent the edge of the panel (block 110). The present digitizer system then generates position signals for the two panels in a known manner using a conventional algorithm (blocks 112, 114). The next step is to compare the position signals to see if there is agreement in the computed stylus position (block 116). Agreement between the competing signals renders the choice therebetween immaterial.

If the calculated position for each responding panel indicates a different stylus position, the present digitizer system must ascertain which of the signals is correct. In doing so the present system compares the coarse stylus position returned by each of the panels and selects the panel position signal which indicates a location closest to that panel's center (block 118). Assuming a valid signal can be selected, a position signal is output on line 120. The present system may also include other signal processing procedures which can be incorporated in certain applications to enhance the range of the coarse position signals.

In the preferred embodiment, the panels are overlapped 8 inches, although in some applications as little as 3 inches of overlap can be used. Should one of the panels generate a position signal of a magnitude less than 8 inches from the edge, it is clearly erroneous. The system is designed to select the signal whose value places it is more closely located to the center of the panel.

Figure 11:
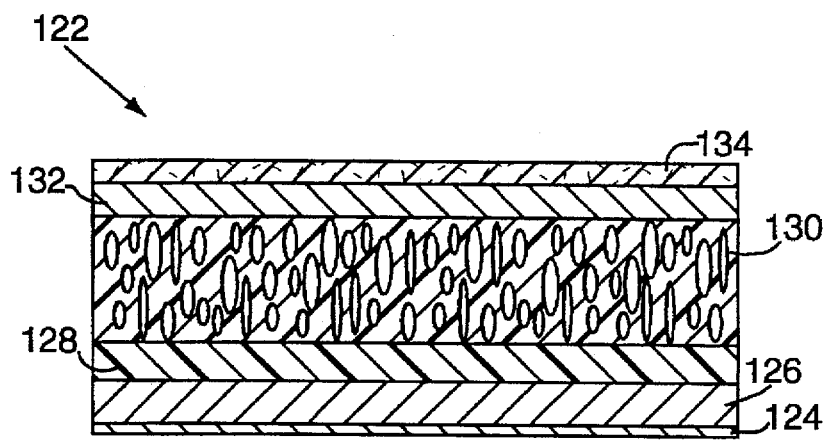
FIG. 11 is a simplified schematic illustration, in section, of a portion of a digitizer provided in accordance with the present invention characterized by a core of substantial thickness.

Referring now to FIG. 11 there is shown, in section, a portion of a digitizer tablet 122 used in the preferred embodiment. The tablet is a laminate structure whose individual layers have exaggerated thickness for illustrative purposes. The tablet resides on a bottom steel plate 124 which acts as a return for the magnetic flux from the cursor coil. The steel sheet is preferably galvanized and blocks out stray signals; actually focusing the magnetic flux and improving the performance of the tablet. Upon an upper surface of the steel panel there is a digitizer panel assembly 126 of two or more panels. The panel assembly receives a preferably 1/16 inch thick pbc plastic bottom sheet 128 which itself receives a thick core 130. There may be several additional top layer(s) on the core, including a top sheet 132 of paper. The paper is 1/8 inch in thickness with the preferred tablet and receives the material or hide 134 that is to be cut. In some embodiments a hold down layer (not shown) is also included.

Figure 12:
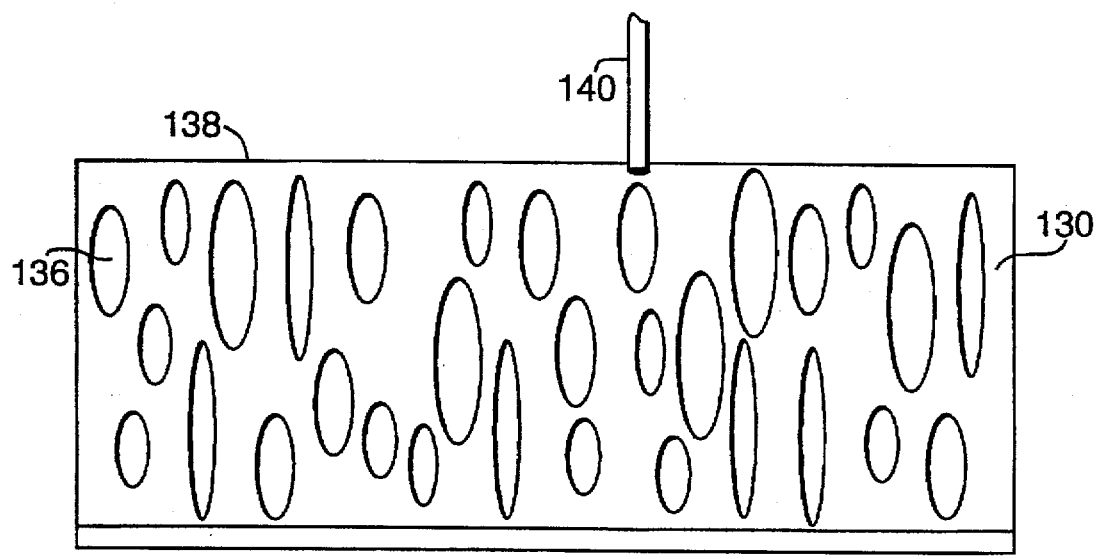
FIG. 12 is a more detailed schematic illustration of the core of FIG. 11.

FIG. 12 shows a more detailed view of the tablet section of FIG. 11 highlighting the core. In the preferred embodiment which is adapted for use with a fabric or hide cutter, the core comprises a honeycomb material of approximately 3/4 of an inch in thickness. The core is an overexpanded ABS material which is characterized by a plurality of voids or cavities 136 that extend through out the core. These cavities allow for the evacuation of air, which generate a vacuum on core top surface 138. In a fabric or hide cutting application, a vacuum is useful in securing the fabric to the surface and thereby limit undesirable movement while cutting. A portion of a stylus 140 is also shown.

The total thickness of the preferred tablet is in excess of 1.25 inches. In other embodiments, the core or cap layer can be of a different thickness; minimal as in known digitizers (on the order of 0.1875 inches) or greater, as required for the application. The great separation at which the present digitizer can operate marks an important point of departure of the present invention over the prior art. An increase in excitation signal gain improves performance and the inclusion of the steel (or other ferromagnetic material) as a flux return is an aid as well. The stylus coil has an increased number of turns as compared to known digitizers, while the resonant tuned circuit that provides the excitation signals to the coil is configured to have a sharpened resonant quality (or high "Q") over conventional digitizer circuits. The sense electronics are also moved to the immediate proximity of the grid.

Tilt effects which burden conventional digitizers are substantially reduce with the present digitizing tablet as the (relatively) remote location of the stylus coil in operation coupled with the other features noted above dramatically reduce the sensitivity of the tablet to the deviation of the coil from the vertical. To accomplish a lessened sensitivity to stylus flit, the shape of the present stylus coil has been optimized and located at or very near the tip. Also, the ferrite used with the coil is preferably located within 0.25 inch of the stylus tip. Those skilled in the art will note that tilt effects are not present where a digitizing puck is used in place of a stylus.

Similarly, although the invention has been shown and described with respect to a preferred embodiment thereof, it should be understood by those skilled in the art that various other changes, omissions and additions thereto may be made therein without departing from the spirit and scope of the present invention. For example, the number of panels can be increased in total and can be extended in a plane with corresponding modifications to the controller signal processing.

We claim:

1. A digitizer system for use in generating an array of electrical signals indicative of a two-dimensional position of points on a surface, said digitizer system comprising;
   a lower layer;
   a digitizer tablet having first and second digitizer panels, each of said digitizer panels having
      a first conductor grid oriented parallel to said lower layer and having first and second planar conductor windings oriented in a first direction, said first grid first winding including a plurality of conductor loops having a pitch, with said first grid second winding including a plurality of conductor loops having a pitch slightly different from the pitch of the first grid first winding loops;
      a second conductor grid oriented parallel to said lower layer, said second conductor grid having first and second planar conductor windings oriented in a second direction orthogonal with respect to said first direction, said second grid first winding including a plurality of conductor loops having a pitch, with said second grid second winding including a plurality of conductor loops having a pitch slightly different from the pitch of the second grid first winding loops;
   said first panel having a portion thereof overlaying said second panel such that a section of said first and second conductor grids of each panel overlap;
   first and second filler portions disposed around said first and second panels to form a panel assembly of substantially even thickness on said lower layer;
   a substantially planar core disposed on an upper surface of said panel assembly with a work support surface defining a tablet plane;
   a stylus means having a tip with a coil capable of manipulation relative to said panel assembly, said stylus means further having a means for generating stylus excitation signals in communicating with said panel assembly as said stylus is moved over said work support surface in proximity thereto;
   a controller means electrically communicating with said stylus means and said conductor grids, and including
      a position signal generator means receiving signals from each of said panel conductor grids and generating, for each panel, signals indicative of stylus coil position in said tablet plane,
      a position verification means for evaluating said stylus coil position signals from each panel and for selecting as an output position signal the one of said first and second panel coil position signals computed to be correct.

2. The digitizer system of claim 1 wherein said digitizer tablet further comprises an amplifying means for amplifying induced signals in said panel conductor grids.

3. The digitizer system of claim 1 wherein said stylus means comprises a cordless stylus including a wireless receiver means for the receipt of transmitted stylus coil excitation signals and wherein said controller further includes a wireless transmitter means for transmitting said stylus coil excitation signal.

4. The digitizer system of claim 1 wherein said stylus means further comprises a digitizing puck.

5. The digitizer system of claim 1 wherein said lower layer further comprises a ferromagnetic material.

6. The digitizer system of claim 5 wherein said ferromagnetic layer further comprises galvanized steel.

7. The digitizer system of claim 1 wherein said verification means further comprises a means for comparing a panel coil position signal against signals corresponding to a panel edge border width and further including a means for generating signals to preclude the presentation said panel coil position signal as said output position signal should said panel coil position signal indicate a position within said panel edge border.

8. The digitizer system of claim 1 wherein said tablet core comprises plastic and has a thickness in excess of 0.5 inches.

9. The digitizer system of claim 8 further comprising an air permeable upper layer received on said core upper surface; and wherein said tablet core comprises an overexpanded ABS plastic including a plurality of voids, said core capable of evacuation to provide a vacuum at said core upper surface.

10. The digitizer system of claim 9 further comprising a means for providing a vacuum to said core.

11. The digitizer system of claim 1 wherein said first and second conductor grids of each panel overlap by approximately the magnitude of said first conductor grid pitch.

12. The digitizer system of claim 1 wherein said digitizer tablet further comprises a third panel having a first conductor grid oriented parallel to said lower layer and having first and second planar conductor windings oriented in a first direction, said first grid first winding including a plurality of conductor loops having a pitch, with said first grid second winding including a plurality of conductor loops having a pitch slightly different from the pitch of the first grid first winding loops;

a second conductor grid oriented parallel to said lower layer, said second conductor grid having first and second planar conductor windings oriented in a second direction orthogonal with respect to said first direction, said second grid first winding including a plurality of conductor loops having a pitch, with said second grid second winding including a plurality of conductor loops having a pitch slightly different from the pitch of the second grid first winding loops;

said third panel having a portion thereof overlaying a one of said first and second panels such that a section of said first and second conductor grids of each of said panels overlap;

said controller position signal generator means further comprises a means for receiving signals from said third panel conductor grids and generating signals indicative of stylus coil position in said tablet plane, and wherein said position verification means further comprises a means for evaluating said stylus coil position signals from said third panel and for selecting as an output position signal the one of said first, second or third panel coil position signals computed to be correct.

13. The digitizer system of claim 1 wherein said verification means further comprises a thresholding means for generating signals to preclude the presentation a panel coil position signal as said output position signal should said panel coil position signal not exceed a signal magnitude threshold.

14. A digitizer system for use in generating an array of electrical signals indicative of a two-dimensional position of points on a surface, said digitizer system comprising;

a lower layer;

a digitizer tablet having
 a first conductor grid oriented parallel to said lower layer and having first and second planar conductor windings oriented in a first direction, said first grid first winding including a plurality of conductor loops having a pitch, with said first grid second winding including a plurality of conductor loops having a pitch slightly different from the pitch of the first grid first winding loops;
 a second conductor grid oriented parallel to said lower layer, said second conductor grid having first and second planar conductor windings oriented in a second direction orthogonal with respect to said first direction, said second grid first winding including a plurality of conductor loops having a pitch, with said second grid second winding including a plurality of conductor loops having a pitch slightly different from the pitch of the second grid first winding loops;
 a substantially planar core disposed on an upper surface of said tablet with a work support surface defining a tablet plane, said core having a thickness in excess of 0.5 inch;
 a stylus means having a tip with a coil capable of manipulation relative to said tablet, said stylus means further having a means for generating stylus excitation signals in communicating with said conductor grids as said stylus is moved over said work support surface in proximity thereto; and a controller means electrically communicating with said stylus means and said conductor grids, and including a position signal generator means receiving signals from each of said panel conductor grids and generating signals indicative of stylus coil position in said tablet plane.

15. The digitizer system of claim 14 wherein said controller means further comprises a resonant electrical circuit having a sharpened resonant quality (high "Q").

16. The digitizer system of claim 14 wherein said digitizer tablet further comprises an amplifying means for amplifying induced signals in said panel conductor grids, said amplifying means being located in the immediate proximity of said conductor grids.

17. The digitizer system of claim 14 wherein said stylus means comprises a cordless stylus including a wireless receiver means for the receipt of transmitted stylus coil excitation signals and wherein said controller further includes a wireless transmitter means for transmitting said stylus coil excitation signals.

18. The digitizer system of claim 14 further comprising an air permeable upper layer disposed on said core upper surface; and wherein said core comprises an overexpanded ABS plastic including a plurality of voids, said core capable of evacuation to provide a vacuum at said core upper surface.

19. The digitizer system of claim 18 further comprising a means for providing a vacuum to said core.

20. The digitizer system of claim 13 wherein said verification means further comprises:
 a means for receiving from said thresholding means panel coil position signals having a magnitude in excess of said threshold and for comparing the coil position in said tablet plane indicated thereby;
 a means for presenting a one of said panel coil position signals as said output position signal if said panel coil positions agree; and
 a means, if said panel coil positions do not agree, for presenting as said output position signal, the panel coil position signal determined to indicate the most central location in its associated panel.

21. The digitizer system of claim 13 wherein said thresholding means further comprises:
 a means for generating signals corresponding to an average of said panel coil signals;
 a means for generating signals corresponding to adjusted bias panel signals by subtracting said panel cot average signals from each of said panel coil signals;
 a means for generating signals corresponding to an average of the absolute values of said adjusted bias panel signals;
 a means for generating signals corresponding to adjusted magnitude panel coil signals by subtracting said panel coil absolute value average signals from each of said adjusted bias panel signals;
 a means for selecting as an output position signal the one of said first and second panel coil position signals computed to have a adjusted magnitude panel coil signal equal to or in excess of said signal magnitude threshold.

22. The digitizer system of claim 13 wherein said stylus coil has a ferrite located within 0.25 inches from said stylus tip.

23. The digitizer system of claim 14 wherein said stylus coil has a ferrite located within 0.25 inches from said stylus tip.

* * * * *

UNITED STATES PATENT AND TRADEMARK OFFICE
CERTIFICATE OF CORRECTION

PATENT NO.   : 5,684,692
DATED        : November 4, 1997
INVENTOR(S)  : Kevin M. Williams et al.

It is certified that error appears in the above-indentified patent and that said Letters Patent is hereby corrected as shown below:

Column 5, line 60, please delete "is".

Column 7, line 45, please delete "96,)" and substitute --96).--

Claim 21:

Column 12, line 47, please delete "cot" and substitute --coil--.

Signed and Sealed this

Seventh Day of April, 1998

Attest:

BRUCE LEHMAN

Attesting Officer

Commissioner of Patents and Trademarks